US006874892B1

United States Patent
McDaniel

(10) Patent No.: US 6,874,892 B1
(45) Date of Patent: Apr. 5, 2005

(54) COLOR SETTING MONITORING SYSTEM FOR A DIGITAL PROJECTOR

(75) Inventor: Craig E. McDaniel, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/712,075

(22) Filed: Nov. 13, 2003

(51) Int. Cl.[7] ........................ G03B 21/14; G03B 21/00; G03B 5/22
(52) U.S. Cl. ........................ 353/84; 353/31; 353/121; 359/889
(58) Field of Search ............................ 353/84, 121, 31, 353/30; 362/293; 359/889, 887, 890–892; 349/9, 10, 68, 80

(56) References Cited

U.S. PATENT DOCUMENTS

| | | | |
|---|---|---|---|
| 3,600,076 A | * | 8/1971 | Snyder ........................ 353/20 |
| 5,625,424 A | | 4/1997 | Conner et al. |
| 5,650,832 A | | 7/1997 | Poradish et al. |
| 6,002,452 A | | 12/1999 | Morgan |
| 6,151,345 A | | 11/2000 | Gray |
| 6,334,685 B1 | | 1/2002 | Slobodin |
| 6,362,573 B1 | * | 3/2002 | Helbing et al. ............. 315/155 |
| 6,412,972 B1 | | 7/2002 | Pujol et al. |
| 6,795,140 B2 | * | 9/2004 | Shigeta ........................ 349/106 |
| 2003/0231260 A1 | * | 12/2003 | Pate et al. .................. 348/744 |
| 2004/0080717 A1 | * | 4/2004 | Pate ............................. 353/52 |

* cited by examiner

Primary Examiner—Judy Nguyen
Assistant Examiner—Andrew Sever

(57) ABSTRACT

A color setting monitoring system for a digital projector having at least two color settings includes a gamut generator, configured to control the at least two color settings of the projector, and a controller, configured to detect and store in memory an amount of time that the projector is configured in each of the at least two color settings.

27 Claims, 3 Drawing Sheets

COLOR SETTING MONITORING SYSTEM FOR A DIGITAL PROJECTOR

BACKGROUND OF THE INVENTION

1. Field of the Invention

The present invention relates generally to digital projectors with one or more color settings. More particularly, the invention relates to a system for monitoring the color settings in such a digital projector.

2. Related Art

One type of digital light processor or DLP in common use today employs a digital micromirror device (DMD) to selectively reflect light to produce an image. The light is provided by a high intensity projector light source, and is reflected off of an array of perhaps millions of microscopic mirrors on a DMD chip. This chip is a micromechanical device that selectively tilts the mirrors to reflect the light in a desired pattern. The pattern is dictated by an electronic video signal, such that the entire chip can selectively reflect light to produce a video image.

Where color images are desired using a single DMD device, the light source is filtered through a rotating color wheel before striking the DMD chip. The color wheel includes red, green, and blue filters, and rotates in sync with the refresh rate of the video signal to sequentially provide red, green, and blue light for reflection. The mirrors on the DMD chip tilt as needed to reflect the appropriate quantity of each color of light to produce the desired color at a given pixel location. Upon observation, the human eye and brain blend the rapidly alternating constituent colors to perceive a full color image.

Some DLP devices include more than one color wheel, and a mechanism to switch between the two. In addition to the standard three-color (red, green, blue) wheel, these projectors can include a second color wheel with a clear or transparent segment in addition to the red, green and blue segments. The use of this second color wheel provides a brighter image because the transparent segment allows more light through the color wheel per unit time. However, because the additional light is white, the effect is to wash out the image slightly. Operation of a DLP using the first color wheel is sometimes referred to as "video" mode, while use of the second color wheel is sometimes referred to as "business graphics" mode. Operation in video mode provides excellent color saturation, but not as bright a picture. Operation in business graphics mode provides a brighter picture, but with less than ideal colors.

Some projectors with two color wheels also have a third setting, wherein neither of the color wheels are used. This setting does not filter the projected light, and thereby creates a very bright black-and-white image. Users are thus able to switch between video mode, business graphics mode, and black-and-white mode whenever desired.

The trade-off between rich color and brightness is considered appropriate in certain circumstances. For example, a video image with very rich color is generally desired for television, video, and movies. Because such viewing is frequently done in a slightly darkened room, an image of lesser brightness can be acceptable. However, in a brighter room, a brighter image is needed. This is frequently the case in places such as conference rooms, business offices, etc. where displays of text, lower quality graphics, and the like are common. Because high quality video images may not be required in such situations, a bright image without the richer color is acceptable.

While many DLP devices include the apparatus for projecting in the various illumination and color modes mentioned above, they do not typically include any mechanism for monitoring how long the projector is used in any one mode, or how often the color wheel and light intensity modes are switched. Consequently, designers and makers of DLP devices have relatively limited knowledge of which modes are most commonly used, and which projector devices are typically used in which ways. Their knowledge is largely based on speculation and conjecture, and not factual data. Thus, a projector device intended primarily for business graphics may end up more often used for high quality color video projection. Likewise, another model expected to be used more for home video projection may become popular with professionals and used frequently in a business setting where lower quality color is acceptable.

SUMMARY OF THE INVENTION

It has been recognized that it would be advantageous to develop a system for monitoring and tracking the frequency and duration of use of the various color settings in a digital projector.

The invention advantageously provides a color setting monitoring system for a digital projector having at least two color settings. The system includes a gamut generator, configured to control the at least two color settings of the projector, and a controller, configured to detect and store in memory an amount of time that the projector is configured in each of the at least two color settings.

Additional features and advantages of the invention will be apparent from the detailed description which follows, taken in conjunction with the accompanying drawings, which together illustrate, by way of example, features of the invention.

DETAILED DESCRIPTION

Figure 1:
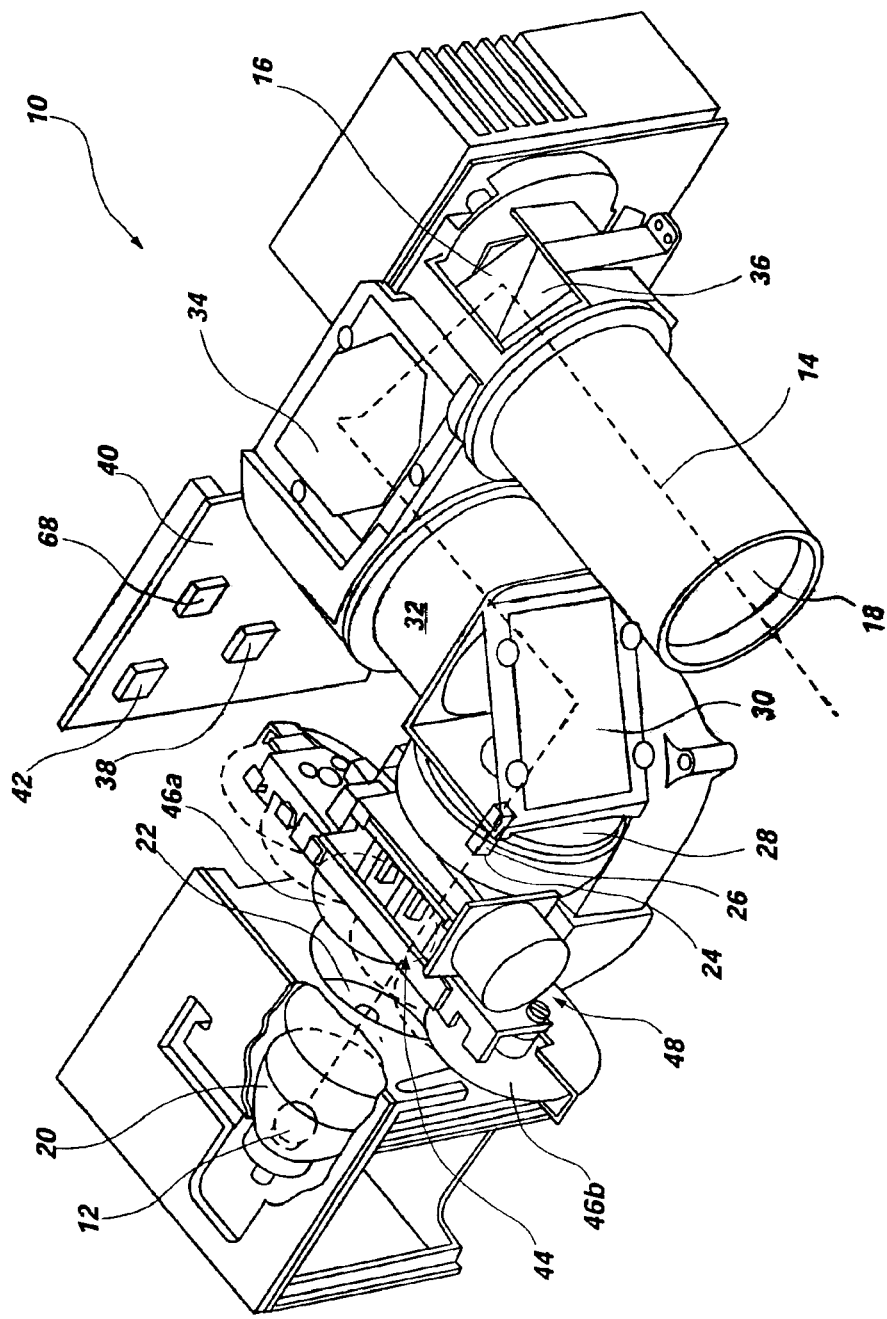
FIG. 1 is a perspective view of one embodiment of a digital projector device having multiple color wheels on a color wheel shifting mechanism, and a color wheel position monitor in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Many digital projectors have multiple color settings, and are often purchased with one or another type of use in mind. For example, a businessman may purchase a projector intending to use it primarily for slide shows, Power Point® presentations, and the like. As such, "business graphics" mode is primarily desired. However, the principal use can change from what was initially intended. The businessman may find that the projector becomes used more for television, movies, etc. in "video" than in business graphics mode. Additionally, a user may find black-and-white mode more useful than originally thought. Consequently, the user may employ certain color settings more than others, and more than originally intended.

Digital projectors also frequently have more than one lamp mode. Because high intensity projector lamps are very expensive, the lamps can be used in standard mode, or a lower intensity "lamp saver" mode. The lamp saver mode puts out less light, but uses less energy and lengthens the useful life of the lamp. Where lighting conditions allow, this mode can be adequate.

Advantageously, the present invention provides a system and method for monitoring the color settings of a digital projector that has more than one color setting. The system can also monitor the lamp settings where the projector has more than one lamp intensity setting. In one specific embodiment, the invention provides a system for monitoring the position of the color wheels in a digital projector, and also for monitoring the intensity level of the lamp in combination with the various color wheel settings. The invention monitors how long a given color wheel is in use and how often the color wheels are switched, as well as the lamp intensity used with each color wheel setting. It will be apparent, however, that the invention is not limited to projectors having moveable color wheels, but can be applied to projector devices that control color settings in other ways.

Figure 3:
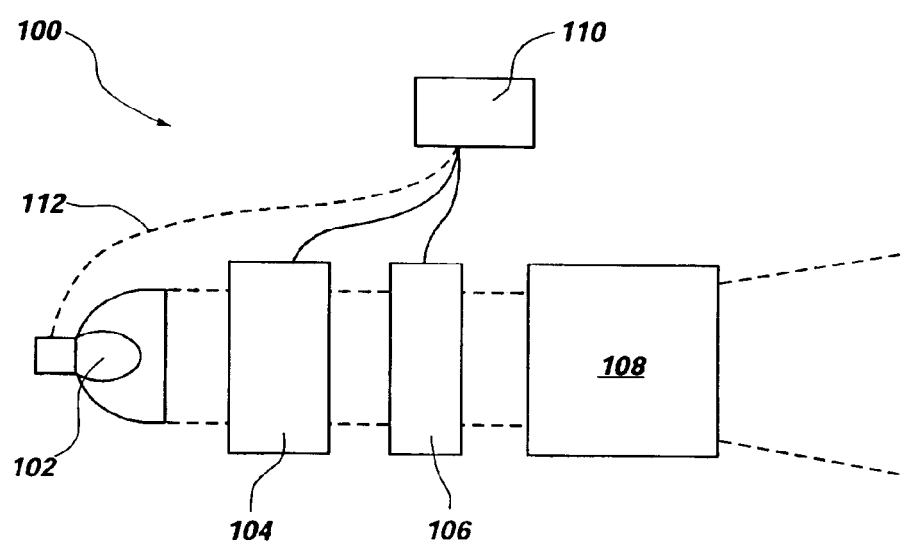
FIG. 3 is a block diagram of a digital projector having a color setting monitoring system in accordance with the present invention.

Provided in FIG. 3 is a block diagram of a digital light processor (DLP) 100 including a color setting monitoring system in accordance with the present invention. The DLP includes a light source 102, which provides projection light to a gamut generator 104, that controls at least two color settings of the projector. The at least two color settings could include, for example, a high color saturation setting and a lower color saturation setting. The color settings could also include a black-and-white setting. The gamut generator could be various devices. A color wheel is one type of gamut generator. A beam splitter system could also be used as a gamut generator. The colored light is then processed by a spatial light modulator 106 to produce the desired video image. There are a variety of types of spatial light modulators, including digital micromirror devices, liquid crystal devices, etc. The completed image is than projected for viewing via the projection optics 108.

The digital light processor 100 includes a controller 110 that is interconnected to the gamut generator 104 and the spatial light modulator 106, so as to control these devices in sync with each other to produce the desired image. In accordance with the present invention, the controller also includes a color setting monitoring system. This system comprises programming and memory for detecting and storing in memory an amount of time that the projector is configured in each of the at least two color settings. The number of times the color settings are switched can also be detected and stored. Additionally, as indicated by dashed line 112, the controller may also be interconnected to the light source 102, so that the color setting monitoring system can monitor the settings of the lamp. For example, where the light source includes multiple power settings, the duration of use in those different settings in combination with the various color settings can also be monitored. The controller can be configured so that the data detected and stored by the color setting monitor can be accessed directly or via other electronic devices.

Viewing FIG. 1, there is shown another embodiment of a DLP projector system 10 that is compatible with the present invention. The projector includes a light source, e.g. a high intensity projector lamp 12, which provides white light that passes along a light path (represented by the dashed line 14) to a DMD chip 16 that reflects the desired image through a projection lens 18. Light from the projector lamp is reflected by an elliptical reflector 20, and initially passes through an infrared (IR) and ultraviolet (UV) filter 22 that removes unwanted wavelengths from the projector light. Those skilled in the art will recognize that it is not desirable to project unnecessary amounts of infrared light (i.e. heat) through the projector, nor is it desirable to pass ultraviolet light through the projector.

The elliptical reflector projects the light to a narrow focus point 24 located at the inlet to an integrating rod 26. The integrating rod homogenizes the light. The exit of the integrating rod is imaged onto the DMD by a telecentric condenser lens system comprising a first lens assembly 28, a first reflector 30, a second lens assembly 32, and a second reflector assembly 34. A total internal reflection (TIR) prism 34 is disposed adjacent to the DMD 16 to fold the light onto the DMD at the proper angle of incidence. The DMD device is oriented at just the right angle so that light for the image is reflected through the projection lens 18, while undesired light is reflected away from the lens through a beam dump (not shown) toward a light absorber (not shown).

The projector 10 is controlled by a microprocessor 38 disposed on a circuit board 40. This microprocessor includes the control circuitry and programming for modulating the DMD chip 16 to tilt the array of micro-mirrors in accordance with a video signal. The circuit board also includes digital memory chips 42 and other required devices for controlling the projector.

Figure 2:
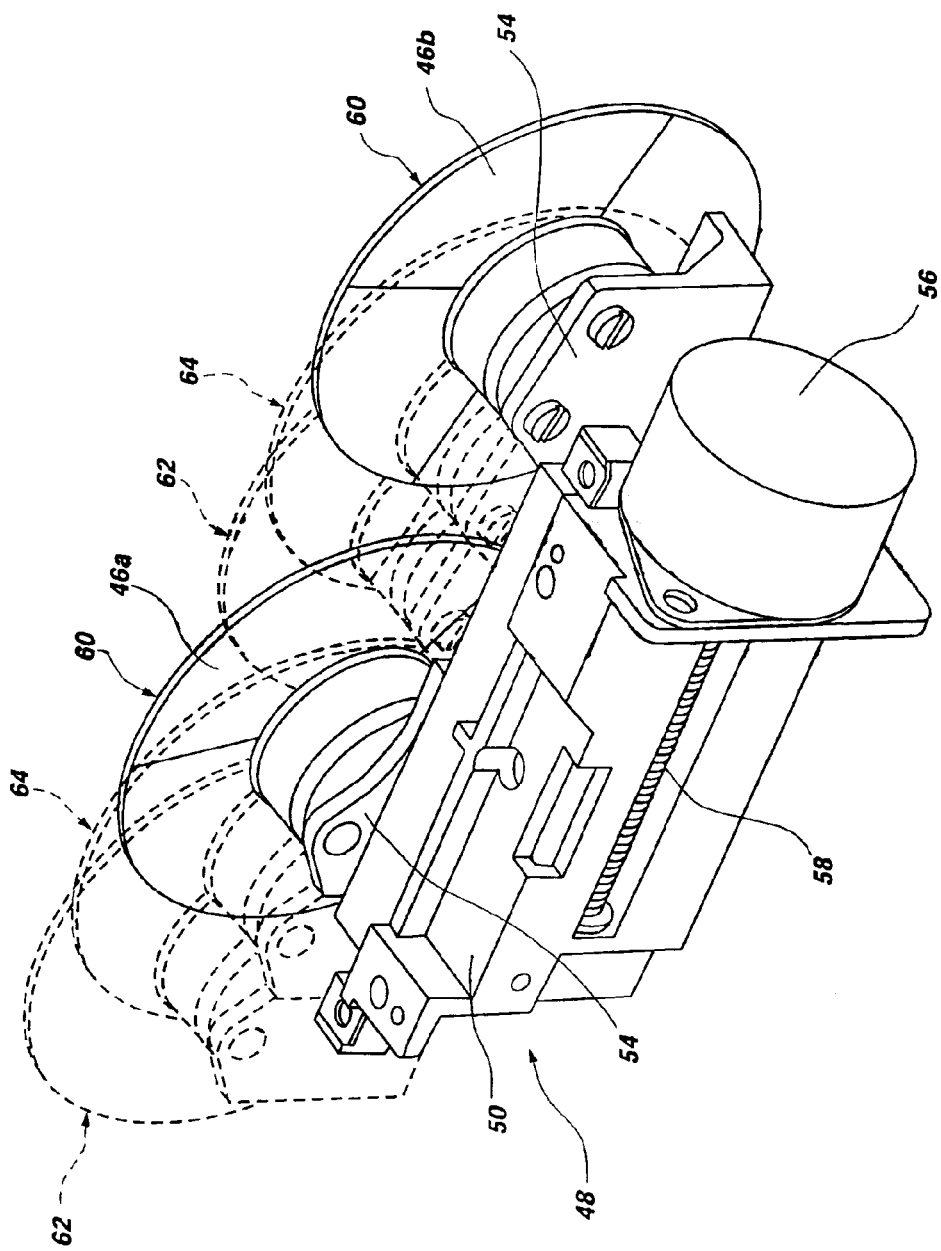
FIG. 2 is a close-up inverted perspective view of the color wheels and color wheel shifting mechanism of the projector apparatus of FIG. 1.

Disposed between the IR/UV filter 22 and the integrating rod 26 is a color wheel position 44. In the digital projector embodiment shown, two color wheels 46a and 46b are located adjacent to the color wheel position, and are attached to a color wheel shifting mechanism 48. One embodiment of the color wheels and color wheel shifting mechanism is shown in both FIG. 1 and FIG. 2. The view of the color wheel shifting mechanism shown in FIG. 2 is inverted and reversed from the perspective shown in FIG. 1. The color wheel shifting mechanism and the electronics that control it provide the color setting shifting device for the depicted projector. Those skilled in the art will recognize that the type of projector depicted herein could be configured with more or less than two color wheels. Likewise, the present invention could be applied to different types of projectors (e.g. those without color wheels) that control color in different ways and have different devices for controlling the color settings.

The color wheels 46 each include red, green, and blue filter segments, and rotate in sync with the refresh rate of the projector to filter the light from the light source. White light from the light source 12 is directed through the various filter materials of the color wheel, which rotates in sequence with the red, green, and blue video signals being sent to the DMD device 16 so as to produce a color image. The first color wheel 46a is a three-segment wheel (red, green, blue) for video or full color mode, and the second color wheel 46b is a four-segment wheel (red, green, blue, clear) for the brighter but less rich business graphics mode.

The color wheel shifting mechanism 48 generally comprises frame 50, a slide 52, a color wheel bracket 54, a servomotor 56, and an actuator screw 58. The color wheels 46 are mounted on the color wheel bracket, which is free to slide laterally upon the slide. The color wheel bracket is connected to the actuator screw, such that rotation of the actuator screw causes the color wheel bracket to slide back and forth on the slide. The servomotor is controlled by the microprocessor 38, to selectively place one or the other of the color wheels 46 (or no color wheel, for black-and-white mode) into the color wheel position 44 to filter the light.

The color wheel shifting mechanism 48 has three positions that are alternatingly exclusive between the color wheels. The position of the color wheels shown in solid lines in FIG. 1 is a first color wheel position 60, wherein the first color wheel 46a is placed in the light path 44, and the second color wheel 46b is away from the light path. Because the first color wheel includes just the red, green and blue filter segments, this configuration provides the video or full color mode for the projector. The second color wheel position 62, shown by dashed lines, is the extreme opposite position, wherein the first color wheel is shifted out of the light path, and the second color wheel is placed in the light path. Because the second color wheel is a four-segment wheel, having red, green, blue and dear filter segments, this configuration produces the brighter but less rich business graphics mode. The third color wheel position 64, also represented by dashed lines, is midway between the first and second color wheel positions. In this position, the light path passes between the two color wheels, providing unfiltered white light for projection of an image. Because there is no color filtration of the light source in this configuration, this setting produces a very bright black-and-white image.

Because the various color wheel settings provide different filtering levels, and therefore different light intensities, the projector lamp can also have multiple intensity levels. The lamp 12 shown in FIG. 1 has both "standard" (i.e. high intensity) and "lamp saver" (i.e. low intensity) modes. When black-and-white projection is chosen, lamp saver mode usually provides adequate illumination, even in relatively bright surroundings. However, in video or full graphics mode, higher intensity illumination is generally desired, except perhaps in very dark surroundings. In business graphics mode, the lower lamp intensity is usually adequate, except in the brightest surroundings.

It will be apparent that with three projection modes and two illumination levels, some system must be provided to control the switching between the various modes. This can be done in various ways. One simple control method includes simple electromechanical switches (not shown) disposed on the outside of the projector case, one for controlling the projection mode, and another for controlling the lamp intensity. With such switches, a user can directly switch the modes as desired. Alternatively, rather than mechanical color mode and lamp intensity switches, the projector can be controllable through a video control panel that provides the virtual equivalent. Such on-screen control and programming of video devices is well known. Televisions, VCR's, and DVD players frequently include an on-screen menu that allows a user to select and control various operational parameters, such as color, contrast, subtitles, etc., using a remote control device. With the projector operating, a user presses a button on the remote control device (or a comparable button on the projector case) to display the programming menu. The user can then select the desired lamp and color mode, then exit the menu to allow the projector to project an input signal, such as a TV, video, or computer signal.

Whether using mechanical switches or on-screen programming, the microprocessor 38 is electronically "aware" of the settings of the lamp and color wheels. Advantageously, the microprocessor includes a time clock that continuously tracks the time and date (either relative or absolute), and tabulates and stores in memory information regarding the duration of settings for the color wheels 46 and lamp 12. Specifically, the color wheel position monitor according to the present invention can include seven counters in its programming. A first counter provides a measure of the total time that the first color wheel 46a is engaged (i.e. disposed in the light path) with the projector operating in standard lamp mode. A second counter measures how long the first color wheel is engaged in lamp saver mode. A third counter measures how long the second color wheel 46b is engaged in standard lamp mode. A fourth counter measures how long the second color wheel is engaged in lamp saver mode. A fifth counter measures how long the projector operates in standard lamp mode with neither color wheel engaged. A sixth counter measures how long the projector operates in lamp saver mode with neither color wheel engaged. Finally, a seventh counter records the number of times the position of the color wheel is switched. It will be apparent that a color wheel position monitor according to the present invention could include more or less than seven counters, particularly in a projector with more or less than three color wheel positions, and more or less than two lamp modes.

The color wheel position monitor system can detect and measure these various parameters in various ways. In one embodiment, the position monitor programming can be configured to periodically check (e.g. every so many seconds) the color wheel position and lamp setting whenever the projector is in operation. This information is stored in memory and added to the running total of time of operation in a particular configuration. Alternatively, the position monitor can be programmed to detect and store in memory the time at which any of the settings are changed. For example, whenever the lamp mode or color wheel setting is changed, the position monitor detects this, checks the time, and stores a record in memory of the time, date, and nature of the change. The system thereafter monitors total running time of the projector until another change is made, and the process starts over.

Over time, as the position monitor checks the configuration, or as changes are made, the programming of the position monitor keeps a running total of the time of use in the various mode configurations described above. This information can then be accessed in various ways. The on-screen programming system of the projector discussed above could include menu options that allow one to view the data recorded by the various counters. This menu could be accessible by ordinary users, or restricted to approved maintenance personnel. For example, a user or technician turns the projector on and calls up the on-screen menu. The user selects a "diagnostics" menu option, which brings up a screen that shows that the color wheels have been switched 48 times, the projector has been used in full color mode with the lamp at high intensity for 450 hours, in business graphics mode with high intensity for 230 hours, and in black-and-white mode with the lamp at low intensity for 14 hours, representing a total usage of 694 hours.

Alternatively, data from the color wheel position monitor system could be viewed remotely. For example, the projector can be connected to a network, such as a LAN, thus allowing network users to remotely monitor and control the device. Alternatively, the circuit board 40 can include a built-in web server 68, which creates a unique world wide web address for the projector. Such servers are desirable to allow remote control and monitoring of various devices. Any person who knows the web address and can access the web page (e.g. having an appropriate password), whether the owner of the device, a technician, or other user, and can remotely "contact" the projector and review the color wheel position monitor information, can change the color wheel settings, or take other possible actions.

As yet another alternative, the data from the color wheel position monitor can be downloaded directly to another digital device (e.g. a computer or specialized diagnostic device) through a data connection, such as a data cable (not shown) interconnected with the circuit board 40 and microprocessor 38. In this way, a service technician or other personnel can determine all of the parameters of use of the color wheel positioning system, allowing better diagnoses of problems and providing useful information for design improvements.

From a broad perspective, the invention provides a color setting monitoring system for a digital projector having at least two color settings, providing information on when and how long the various color settings are used. The system includes a color setting shifting device, configured to control the color setting of the projector, and a microprocessor configured to detect and store in memory an amount of time that the projector is configured in each of the at least two color settings. While the invention is shown with respect to a digital projector that uses color wheels to provide the different color settings, it is compatible with other types of projectors. In the depicted embodiment, the invention advantageously allows monitoring of the position of the color wheels, providing information on when and how long the various color wheels are used, and in which lamp setting. It enables service and support personnel to gather data on the reliability of the color wheels and the wheel changing mechanism. It also enables marketing personnel to gather data on which color settings customers actually use, and how long. Among other uses, this information can be used to improve the configuration and design of future products, and to adjust the target market for existing or planned products.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A color wheel position monitor for monitoring a position of at least one color wheel in a digital projector, the color wheel being moveable between an engaged position that is in a light path, and a disengaged position that is out of the light path, comprising:
   a) a color wheel shifting device, configured to control the position of the at least one color wheel; and
   b) a microprocessor, configured to detect and store in memory an amount of time that the at least one color wheel is disposed at the engaged position.

2. A color wheel position monitor in accordance with claim 1, wherein the at least one color wheel comprises two color wheels, and the engaged and disengaged positions comprise one engaged position and two disengaged positions for each other wheel.

3. A color wheel position monitor in accordance with claim 2, wherein the engaged and disengaged positions comprise a first position wherein a first color wheel is engaged and a second color wheel is disengaged, a second position wherein the second color wheel is engaged and the first color wheel is disengaged, and a third position wherein neither the first nor the second color wheels are engaged.

4. A color wheel position monitor in accordance with claim 3, wherein the microprocessor is configured to detect and store in memory
   a) a cumulative amount of time during which the first color wheel is engaged;
   b) a cumulative amount of time during which the second color wheel is engaged; and
   c) a cumulative amount of time during which neither color wheel is engaged.

5. A color wheel position monitor in accordance with claim 2, wherein the color wheels comprise red, green, and blue filter sectors for filtering substantially white light from a projector lamp associated with the projector, and wherein one of the color wheels further comprises a transparent sector.

6. A color wheel position monitor in accordance with claim 1, wherein the color wheel position monitor is further configured to detect and store in memory a total number of times the position of the color wheels is switched.

7. A color wheel position monitor in accordance with claim 1, further comprising a projector lamp having low and high intensity settings, respectively.

8. A color wheel position monitor in accordance with claim 7, wherein the microprocessor is further configured to detect and store in memory an amount of time that the at least one color wheel is disposed at the engaged position with the projector lamp in the low and high intensity settings, respectively.

9. A color wheel position monitor in accordance with claim 1, wherein the at least one color wheel comprises red, green, and blue filter sectors for filtering substantially white light from a projector lamp associated with the projector.

10. A color wheel position monitor in accordance with claim 1, further comprising a data output system, configured to allow a user to obtain data representing the amount of time that the at least one color wheel is disposed at the engaged position.

11. A color wheel position monitor in accordance with claim 10, wherein the data output system is selected from the group consisting of an on-screen projector control system, a network connected control system, a world wide web control and access system, and a physical data link to another digital device.

12. A digital projector device, comprising:
   a) a projector lamp, configured to project light along a light path;
   b) a first color wheel, having three filter sectors, configured to filter light from the projector lamp;
   c) a color wheel shifting device, configured to move the first color wheel between an engaged position intersecting the light path, and a disengaged position outside the light path; and
   d) a color wheel position monitor, configured to detect and store in memory a cumulative amount of time that the first color wheel is in the engaged and disengaged positions, respectively.

13. A device in accordance with claim 12, further comprising:
   a) a second color wheel, configured to move between an engaged position intersecting the light path, and a disengaged position outside the light path, the position of the second color wheel being controlled by the color wheel shifting device;

b) the color wheel shifting device being configured such that only one of the first and second color wheels can be engaged at a given-time; and c) the color wheel position monitor being further configured to detect and store in memory a cumulative amount of time that the second color wheel is in the engaged and disengaged positions, respectively.

14. A device in accordance with claim 13, wherein at least one of the first and second color wheels further comprises a transparent sector.

15. A device in accordance with claim 13, further comprising a data output system, associated with the color wheel position monitor, configured to allow a user to obtain data representing the cumulative amount of time that the first and second color wheels are engaged and disengaged, respectively.

16. A device in accordance with claim 12, wherein the projector lamp has a low intensity setting and a high intensity setting, and wherein the color wheel position monitor is further configured to detect and store in memory a cumulative amount of time that the first color wheel is in the engaged and disengaged positions, with the lamp in high intensity and low intensity settings, respectively.

17. A digital projector device, comprising:

a) a projector lamp, configured to project white light along a light path to a digital mirror device, the lamp having a low intensity setting and a high intensity setting;

b) at least one rotating color wheel, having colored sectors for filtering light prior to incidence of the light on the digital mirror device;

c) a color wheel shifting mechanism, configured to selectively move the at least one color wheels, the color wheel shifting mechanism having
   (i) a first position wherein the at least one color wheel is disposed in an engaged position intersecting the light path; and
   (ii) a second position wherein the at least one color wheel is not disposed in the engaged position; and d) a color wheel position monitor, configured to detect and store in memory data representing
   (i) a cumulative amount of time during which the at least one color wheel is in the engaged position and the lamp is in the high intensity mode;
   (ii) a cumulative amount of time during which the at least one color wheel is in the engaged position and the lamp is in the low intensity mode;
   (iii) a cumulative amount of time during which the at least one color wheel is not in the engaged position and the lamp is in the high intensity mode;
   (iv) a cumulative amount of time during which the at least one color wheel is not in the engaged position and the lamp is in the low intensity mode; and
   (v) a total number of times the position of the at least one color wheel is switched.

18. A device in accordance with claim 17, further comprising a data output system, configured to allow a user to obtain data detected and stored by the color wheel position monitor.

19. A device in accordance with claim 18, wherein the data output system is selected from the group consisting of an on-screen projector control system, a network connected control system, a world wide web control and access system, and a physical data link to another digital device.

20. A device in accordance with claim 17, wherein the first and second color wheels comprise red, green, and blue filter sectors, and wherein one of the first and second color wheels further comprises a transparent sector.

21. A color setting monitoring system for a digital projector having at least two color settings, comprising:

a gamut generator, configured to control the at least two color settings of the projector; and a controller, configured to detect and store in memory an amount of time that the projector is configured in each of the at least two color settings.

22. A color setting monitoring system in accordance with claim 21, wherein the projector further includes a projector light source having at least two light intensity settings, and wherein the controller is further configured to detect and store in memory an amount of time that the projector is configured in each of the at least two color settings with the light source in each of its light intensity settings.

23. A color wheel position monitor for monitoring a position of at least one color wheel moveable between engaged and disengaged positions in a digital projector, comprising:

a) means for controlling the position of the at least one color wheel; and b) means for detecting and storing in memory an amount of time that the at least one color wheel is at the engaged position.

24. A method for monitoring a position of at least one color wheel moveable between engaged and disengaged positions in a digital projector, comprising the steps of:

a) detecting when the at least one color wheel is disposed at the engaged position; and b) storing in memory data representing an amount of time that the projector is operated with the at least one color wheel disposed at the engaged position.

25. A method in accordance with claim 24, further comprising the steps of:

c) detecting an intensity setting of a projector light source having at least two intensity settings; and d) storing in memory an amount of time that the projector is operated with the at least one color wheel disposed at the engaged position with the light source set at one of the at least two intensity settings.

26. A method in accordance with claim 24, wherein the at least one color wheel comprises two color wheels, the engaged position being alternatingly exclusive between the two color wheels, and wherein:

e) the step of detecting when the at least one color wheel is disposed at the engaged position further comprises detecting when each of the two color wheels are disposed at the engaged position, respectively; and f) the step of storing in memory an amount of time that the projector is operated with the at least one color wheel disposed at the engaged position comprises detecting when each of the two color wheels is disposed at the engaged position, respectively.

27. A method in accordance with claim 24, further comprising the step of viewing the data stored in memory representing the amount of time that the projector is operated with the at least one color wheel disposed at the engaged position.

* * * * *